(12) United States Patent
Hasinski

(10) Patent No.: US 7,329,298 B1
(45) Date of Patent: Feb. 12, 2008

(54) FILTER

(75) Inventor: Julian Hasinski, Elloughton (GB)

(73) Assignee: Aerotech Engineering Limited (GB)

( * ) Notice: Subject to any disclaimer, the term of this patent is extended or adjusted under 35 U.S.C. 154(b) by 208 days.

(21) Appl. No.: 10/129,355

(22) PCT Filed: Nov. 3, 2000

(86) PCT No.: PCT/GB00/04234

§ 371 (c)(1),
(2), (4) Date: May 3, 2002

(87) PCT Pub. No.: WO01/33050

PCT Pub. Date: May 10, 2001

(30) Foreign Application Priority Data

Nov. 4, 1999 (GB) .................................. 9925992.1

(51) Int. Cl.
*B01D 47/00* (2006.01)

(52) U.S. Cl. .................. 55/385.3; 55/283; 55/523; 55/DIG. 10; 55/DIG. 30; 96/233; 96/344; 60/286; 60/303; 60/311; 123/198 E; 210/741; 210/779; 210/797

(58) Field of Classification Search ............... 55/283, 55/466, 523, DIG. 10, DIG. 30, 385.3; 60/286, 60/303, 311; 123/198 E; 210/741, 779, 210/797; 96/233, 344
See application file for complete search history.

(56) References Cited

U.S. PATENT DOCUMENTS

| | | | | |
|---|---|---|---|---|
| 2,837,170 A | | 6/1958 | Armstrong | |
| 3,100,146 A | | 8/1963 | Huntington | |
| 3,738,089 A | | 6/1973 | Brill | |
| 3,782,115 A | * | 1/1974 | Johnson ........................ | 60/274 |
| 3,812,657 A | * | 5/1974 | Lampinen ..................... | 96/273 |
| 3,831,377 A | * | 8/1974 | Norin ........................... | 60/274 |
| 3,907,523 A | * | 9/1977 | Melin, Jr. ..................... | 95/224 |
| 4,049,399 A | * | 9/1977 | Teller ............................ | 95/36 |
| 4,217,757 A | * | 8/1980 | Crone, Jr. ..................... | 60/288 |
| 4,270,933 A | | 6/1981 | Many et al. | |
| 4,319,453 A | | 3/1982 | Mann | |
| 4,615,173 A | * | 10/1986 | Usui et al. .................... | 60/286 |
| 4,938,787 A | | 7/1990 | Simmerlein-Erlbache | |
| 5,006,265 A | * | 4/1991 | Kar et al. ..................... | 210/741 |
| 5,453,107 A | * | 9/1995 | Liu .............................. | 96/344 |
| 5,469,702 A | | 11/1995 | Tuma et al. | |
| 5,912,370 A | | 6/1999 | McConkey | |
| 5,951,745 A | * | 9/1999 | Gibbs et al. .................. | 96/233 |
| 6,752,846 B2 | * | 6/2004 | Rotter et al. ................ | 55/385.3 |

* cited by examiner

*Primary Examiner*—Duane Smith
*Assistant Examiner*—Minh-Chau T. Pham
(74) *Attorney, Agent, or Firm*—Stephen M. Nipper; Derek H. Maughan; Dykas, Shaver & Nipper, LLP

(57) ABSTRACT

A filter for exhaust gases produced by an internal combustion engine, and a method of using such a mat on a vehicle. The filter is a mat of fibers enclosed within a metal gauze. Preferably, the mats are corrugated and spaced apart within a housing such that exhaust gases will pass through the mats sequentially. The fibers are wettable, and in use are preferably located a sufficient distance from the engine such that the mat is wetted by condensing water or other liquid in the exhaust gas. Preferably also, the filter is adapted for coupling to an existing exhaust pipe opening.

27 Claims, 1 Drawing Sheet

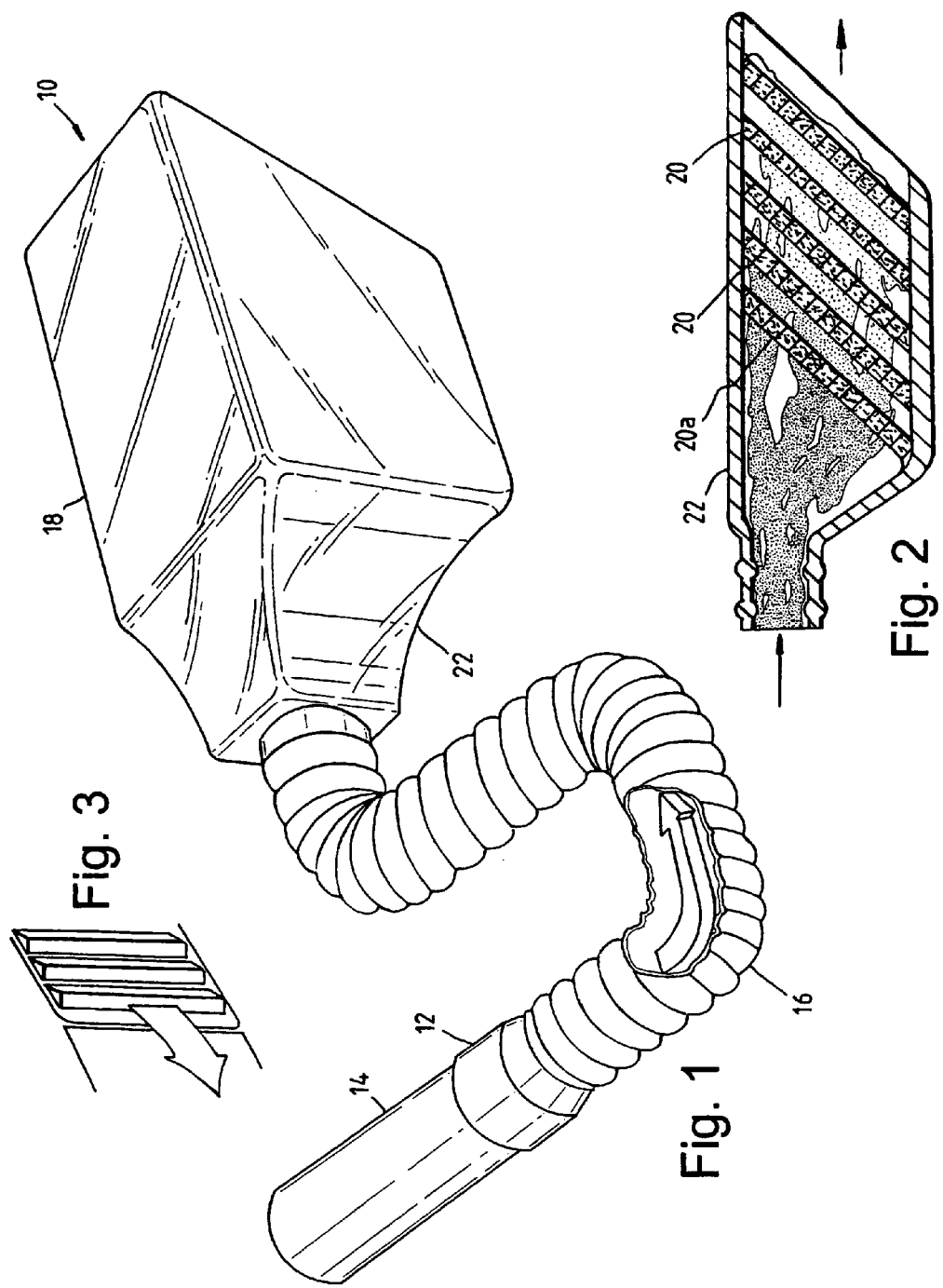

FILTER

CROSS REFERENCES TO RELATED APPLICATIONS

National Stage Entry of PCT application PCT/GB00/04234, filed on Mar. 11, 2000.

BACKGROUND OF THE INVENTION

Field of the Invention

This invention relates to a filter, and in particular to a filter for an exhaust of an internal combustion engine. The invention has particular application in diesel cycle engines.

It is known to provide diesel engine exhausts, particularly in diesel or compression ignition (CI) engined vehicles, with diesel-specific catalytic convertors and regenerative filter systems. Existing catalytic convertors have a number of drawbacks including high initial cost, high weight, high operating temperatures and high engine back pressure, even when new. Further, existing catalytic convertors contain potentially toxic substances which create difficulties in the safe disposal of the convertors at the end of their life. However, conventional catalytic convertors are effective within an engineering compromise and in the absence of an acceptable alternative are currently in wide use.

Catalytic convertors cannot be easily retrofitted to existing vehicles, and also have a limited ability to capture particulates. The current solution for capturing particulates is to employ regenerative filter systems or particulate traps comprising ceramic beads or fibres, the systems being provided in close proximity to the engine and thus operating at high temperatures. However, concerns have been raised regarding the safety of such ceramics, and their continued use appears unlikely. Also, such systems tend to gather the particulates which then burn, due to the high temperatures experienced by the systems, producing ash and additional carbon dioxide, adding to the $CO_2$ produced by the burning fuel. Due to ash build-up, the systems must also be replaced or cleaned at appropriate intervals.

Other filter materials are known, and there is currently available an activated charcoal exhaust filter. However, the filter has a relatively short life and is only intended for use with vehicles being run within enclosed areas, such as buses being maneuvered within bus garages. Paper-based induction filters are widely used, however such filters would be unsuited for use in filtering exhaust gases, and the disposal of such filters is becoming an increasing problem; it is estimated that approximately 4,000 tonnes of paper intake filters are disposed of every day. Further, these filters are typically contaminated with oil and other potentially toxic materials.

It is a further difficulty in providing effective and efficient filtering of exhaust gases that the quality of diesel fuel tends to vary from country to country. For example, in the United Kingdom there is a tendency to use low sulphur diesel, which tends to produce low levels of particulates (or at least relatively small particulates), whereas many countries in continental Europe tend to use diesel containing higher levels of sulphur, which typically produces a "sooty" exhaust output. The most effective means of maintaining a "clean" exhaust output may therefore vary depending on the quality of fuel which the vehicle is using, and thus the country where the vehicle is used.

It is among the objectives of embodiments of the present invention to obviate or mitigate the disadvantages of existing methods of removing undesirable material from exhaust gas, particularly from the exhaust gases produced by diesel-engined vehicles.

SUMMARY OF THE INVENTION

According to a first aspect of the present invention there is provided a filter for exhaust gases produced by an internal combustion engine, the filter comprising a mat of natural fibres.

The invention also relates to a method of using such a filter, particularly in a vehicle.

The fibres may be of any "renewable" fibrous natural material, for example one or more of cotton, sisal, kapok, agave/henequen, abaca/manila hemp, palmetto, flax/linen, hemp/burlap, jute, ramie, kenaf, coir, wool, cellulose fibres or the like. Of these, cotton, sisal, flax/linen, and hemp/burlap are preferred. Most preferably, the mat comprises cotton enclosed within a metal gauze. In alternative aspects of the invention other materials may be utilised, including synthetic or man-made materials, and non-fibrous materials may also be utilised.

Preferably, the filter mat is cleanable, and thus may be cleaned and reused as required, minimising waste.

Preferably also, the filter comprises a plurality of mats. Most preferably, the mats are spaced apart within a housing such that exhaust gases will pass through the mats sequentially.

Preferably also, the fibres are wettable, and in use are preferably located a sufficient distance from the engine such that the mat is wetted by condensing water or other liquid in the exhaust gas. Alternatively, or in addition, the fibres may be pre-wetted, for example with mineral oil. The use of mineral oil is also believed to assist in neutralising dioxins. In certain embodiments, the filter may be cooled to assist in maintaining the filter at an appropriate temperature.

Preferably also, the filter mat is located in a housing of larger cross-sectional area than the bore of the exhaust pipe leading to the filter, such that the exhaust gas is decelerated prior to passing through the mat, such that the momentum of the gas is reduced, and also experiences a drop in temperature; in the absence of such deceleration and cooling, the filter mat is more likely to experience damage from the fast flowing gas, and the pressure waves which are likely to be present in the gas, and would have to operate at a significantly higher temperature. Preferably also, the housing is arranged to provide for substantially laminar flow of gas therethrough, and thus minimise turbulent flow and recirculation of gas within the housing leading to uneven deposition of particulates on the filter mat. However, in certain circumstances a degree of recirculation may be advantageous, allowing particulates to be trapped on both sides of the mat.

Preferably also, the mats further comprises a support for the fibres. In one embodiment the support may comprise a metal gauze, and a support may be provided on each side of the mat. The mat may be corrugated or otherwise formed to increase the surface area thereof. Further support may be provided in the form of a metal mesh, and a mesh may be provided on each side of the mat.

Preferably also, the filter is adapted for connection to an existing exhaust system. Most preferably, a conduit is provided for coupling to an existing exhaust pipe opening, which conduit may include a flexible section. Further, the filter is preferably adapted for mounting in a vehicle, such that the filter may be retrofitted to an existing vehicle.

According to another aspect of the present invention there is provided a method of filtering exhaust gas from an internal combustion engine, the method comprising the steps of:
providing a fibrous filter; and
passing the exhaust gas through a fibrous filter while maintaining the filter in a wetted condition.

Preferably, the filter is wetted by liquid condensing from the exhaust gas. Alternatively, or in addition, the filter may be wetted by liquid carried by the exhaust gas, such as lubricating oil or unburnt fuel. In other embodiments, the filter may be wetted prior to use.

According to a still further aspect of the invention there is provided a filter for exhaust gases produced by an internal combustion engine, the filter comprising a mat of washable fibres.

This aspect of the invention thus allows the filter mat to be cleaned as required, substantially reducing the volume of waste produced.

BRIEF DESCRIPTION OF THE DRAWINGS

These and other aspects of the present invention will now be described, by way of example, with reference to the accompanying drawings, in which:

FIG. 1 is a perspective view of a diesel exhaust filtration system in accordance with an embodiment of the present invention;

FIG. 2 is a sectional view of the filter housing of the system of FIG. 1; and

FIG. 3 is a perspective view of the outlet face of the filter housing of the system of FIG. 1.

DETAILED DESCRIPTION OF THE INVENTION

Reference is first made to FIG. 1 of the drawings, which illustrates a diesel exhaust filtration system 10 in accordance with a preferred embodiment of the present invention. The system 10 comprises a female coupling 12 for location over the open end of an existing exhaust exit 14 of a diesel-engined vehicle. The coupling 12 is mounted on the end of a corrugated flexible pipe 16 which carries the exhaust gases to a housing or filtration box 18 which contains six filter mats or elements 20.

As may be seen from FIG. 2, the box 18 defines a bell mouth 22 such that the velocity of the exhaust gases decreases on entering the box 18. Further, the box 18 and filter elements 20 are configured to provide substantially laminar flow of the exhaust gases through the filter elements, that is the direction of flow is substantially perpendicular to the surfaces of the respective elements 20. It is believed that turbulent flow of the exhaust gases, and recirculation of exhaust gases within the box 18, is generally undesirable as this will result in uneven depositing of particulates on the filter elements 20.

The provision of the bell mouth also has the effect of producing a drop in the temperature of the exhaust gases, typically from 150-250° C. to 60-70° C.

Each filter element includes a centre section of fibrous material, arranged in layers and plies. The material is sandwiched between two layers of steel gauze which are corrugated to increase the surface area of the element. Further, the elements comprise outer layers of steel mesh, for strength.

In use, when the engine is started, the initial relatively cool exhaust gases pass through the system 10, the water vapour in the exhaust gases wetting the filter elements 20. Further, there is also normally some oil vapour in the exhaust gas, such that the cotton in the filter elements becomes wetted or "oiled" by a water\oil emulsion. Tests have shown that such a wetted or oiled filter element is effective in trapping particulates, and in particular in entrapping smaller particulates which would pass through a dry filter element.

The filtration box 18 is located and configured such that exhaust gas temperature remains sufficiently low to maintain the filter elements in the wetted or oiled condition. To this end, in some applications it may be necessary to cool the filtration box or other parts of the system, although the increase in flow area provided by the box 18 is normally effective in providing the necessary temperature reduction.

Tests have shown that a single wetted or oiled filter element as described above is effective in trapping 65% of medium to large particulates. Further, testing indicates that a linear improvement both in particle size and quantity of particles trapped is achieved by adding further filtration layers.

In testing, the system 10 has caused no adverse back pressure in the exhaust duct, the filter elements 20 being arranged within the relatively large cross-section filtration box 18 to present a large surface area and thus minimum restriction to flow; the filtration box 18 minimises the pressure drop across the filter elements 20, in addition to diffusing the flow from the exhaust outlet, reducing its speed and momentum and minimising the possibility of damage to the filter elements 20 by the pressure waves which are present in exhaust ducts.

After a period of use the filter elements 20 may be removed from the filtration box 18 for cleaning. In the illustrated embodiment, where all of the filter elements 20 are the same, the first filter element 20a will require more frequent cleaning, and appropriate cleaning schedules for the various filter elements 20 may be provided to users. To allow for bypass of soiled filter elements, reed valves or other arrangements may be provided, to ensure the free flow of exhaust gases through the system 10.

The illustrated system 10 is intended for retrofitting to an existing vehicle, and it is believed that only a limited number of systems 10 would be required to fit the majority of trucks in the 15 to 38 tonnes range.

It will be apparent to those of skill in the art that the above-described system 10 provides a relatively simple and inexpensive means for reducing particulate output from vehicle diesel engines, and which system 10 may be readily retrofitted to existing vehicles.

Those of skill in the art will also identify that the above-described embodiment is merely exemplary of the present invention, and that various modifications and improvements may be made thereto, without departing from the present invention. For example, the system may be provided as original equipment on a vehicle. Further, the system may be utilised in any internal combustion engine: for example, the system may be retrofitted to a vehicle to reduce the particulates issuing from an older petroleum powered engine, in which engine wear has resulted in the engine burning lubricating oil. Also, the system may be utilised in applications other than vehicles, such as stationary generators. In other aspects of the invention it is also possible that the filter mat will be formed wholly or in part from synthetic or man-made materials.

The invention claimed is:

1. A filter for exhaust gases produced by an internal combustion engine, the filter comprising an inlet for coupling to an engine exhaust system outlet and a housing comprising a gas volume wherein the inlet opens into said gas volume, the gas volume containing a filter mat of natural fibrous material and defining a larger cross-sectional gas flow area relative to the inlet to induce deceleration and cooling of exhaust gases flowing into the housing, wherein the mat is adapted to be wetted by the water condensed from the exhaust gases, permitting the mat to operate in a wetted condition.

2. A filter as claimed in claim 1, wherein the mat is pre-wetted.

3. A filter as claimed in claim 1 or 2, wherein said filter comprises a plurality of said mats.

4. A filter as claimed in claim 3, wherein said filter comprises a plurality of mats arranged within the gas volume such that exhaust gases will pass sequentially through each mat.

5. A filter as claimed in claim 1, further comprising a cooling system adapted for cooling exhaust gases before the exhaust gases reach the mat.

6. A filter as claimed in claim 1, wherein said gas volume is formed and arranged to provide for substantially laminar flow of exhaust gases therethrough.

7. A filter as claimed in claim 1 wherein said mat further comprises support means for supporting the fibres.

8. A filter as claimed in claim 7, wherein said support means comprises a metal gauze.

9. A filter as claimed in claim 7, wherein said support means is provided on both sides of said mat.

10. A filter as claimed in claim 7 wherein said support means comprises a wire mesh.

11. A filter as claimed in claim 1 wherein said mat is corrugated.

12. A filter as claimed in claim 1, wherein said mat is washable to remove particulates therefrom to permit reuse.

13. A filter as claimed in claim 1 wherein said filter is formed and arranged to allow retro-fitting to an existing vehicle exhaust system.

14. The filter of claim 13, wherein said filter further comprises a conduit for coupling to an exhaust pipe outlet opening.

15. The filter of claim 1, wherein the fibres are made from a material selected from the group consisting of cotton, sisal, kapok, agave/henequen, abaca/manila hemp, palmetto, flax/linen, hemp/burlap, jute, ramie, kenaf, coir, wool and cellulose fibres.

16. The filter of claim 15, wherein the mat comprises cotton.

17. A method of filtering exhaust gases from an internal combustion engine, the method comprising the steps of:

coupling a housing comprising a gas volume to an engine exhaust system outlet, the gas volume defining a larger cross-sectional gas flow area than the outlet and containing a mat of natural fibrous material; and passing said exhaust gases through said filter, whereby the exhaust gases are decelerated and cooled on entering the housing and gas volume such that water condenses from the exhaust gases to wet the mat and to permit the mat to operate in a wetted condition.

18. The method of claim 17, wherein the exhaust gases passing through the mat are at a temperature of less than 80° C.

19. The method of claim 18, wherein the exhaust gases passing through the mat are at a temperature of between around 60 and 70° C.

20. The method of claim 19, wherein said mat is further wetted by at least one of lubricating oil and uncombusted fuel.

21. The method of claim 17, wherein the mat is pre-wetted.

22. The method of claim 20, wherein said mat is located at an end of an exhaust system spaced from the engine.

23. The method of claim 22 wherein the exhaust gases are from a diesel engine.

24. The method of claim 17, wherein the exhaust gases are passed through a plurality of mats.

25. A filter for exhaust gases produced by an internal combustion engine, the filter comprising an inlet for coupling to an engine exhaust system outlet and a housing comprising a gas volume containing a plurality of pre-wetted corrugated filter mats of natural fibrous material, said gas volume defining a larger cross-sectional flow area relative to the inlet, said gas volume configured to induce laminar flow of gas through the device and to induce deceleration and cooling of exhaust gases flowing into the housing and gas volume, said plurality of mats arranged within said housing so that exhaust gases will pass sequentially through each mat, said gas volume and said filter mats configured to cause water to be condensed from the exhaust gases whereby said condensed water wets said filter mats thereby allowing said mat to operate in a wetted condition.

26. A filter as claimed in claim 1, further comprising a cooling system adapted for cooling exhaust gases before the exhaust gases reach the mat.

27. The filter of claim 1, wherein said filter further comprises a conduit for coupling to an exhaust pipe outlet opening.

* * * * *